A. L. TRACHTE.
SUBMERGED COMBINATION TANK HEATER AND FEED COOKER.
APPLICATION FILED MAR. 23, 1914.
1,118,599.
Patented Nov. 24, 1914.
2 SHEETS—SHEET 1.
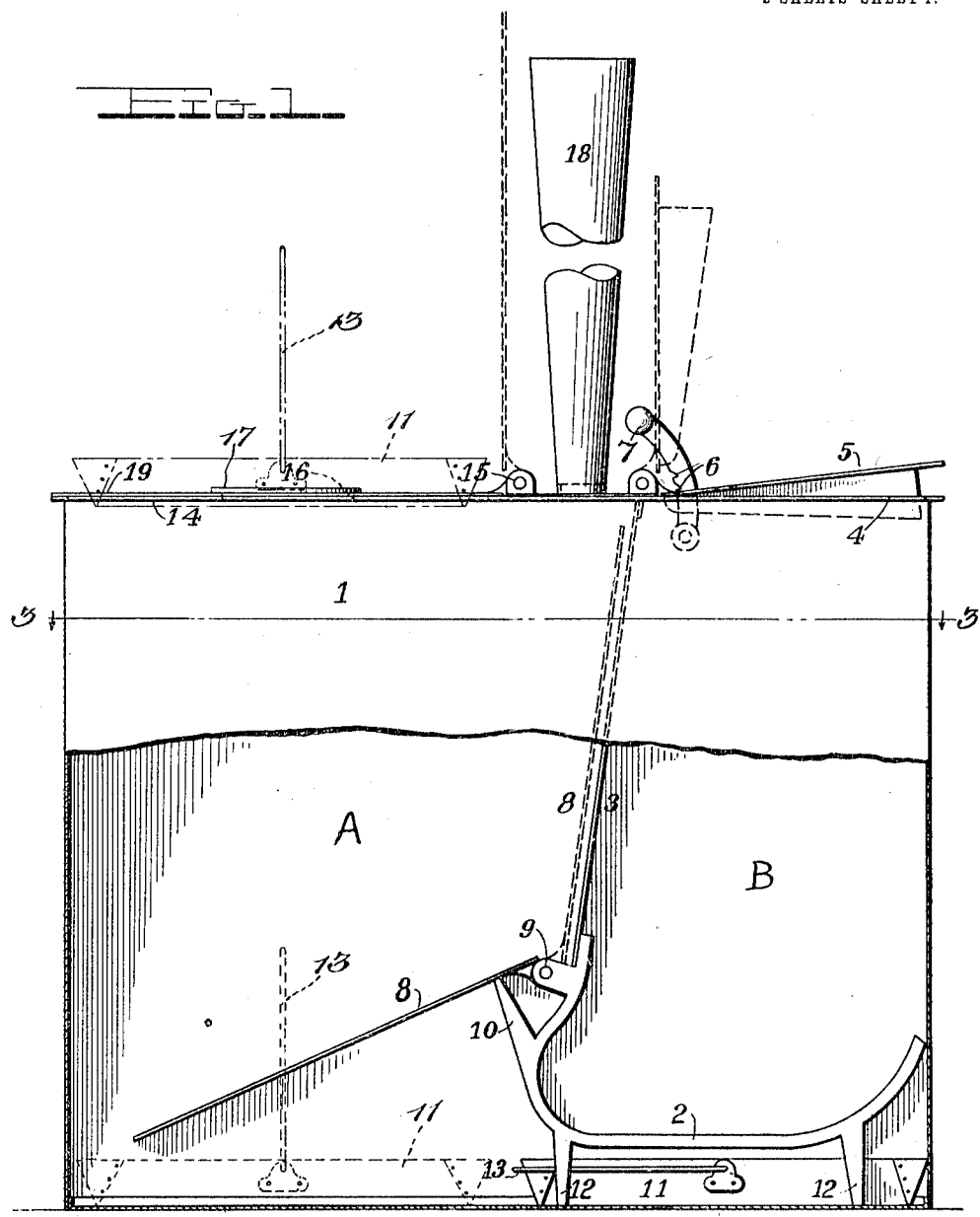
WITNESSES:
Alfred Essex
Edward A. Conroy
Arnold L. Trachte,
INVENTOR
BY
Jerry A. Mathew
ATTORNEY

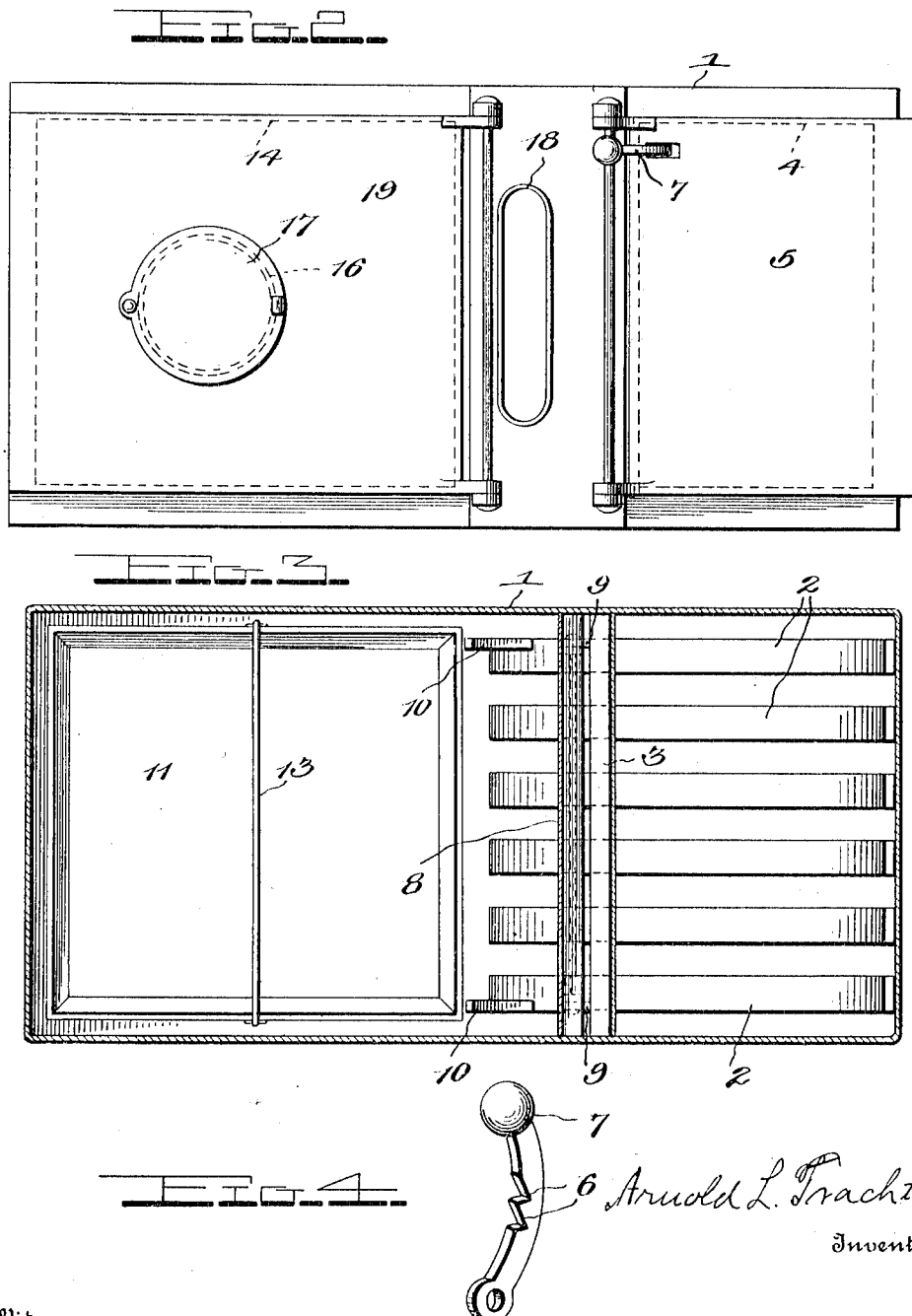

UNITED STATES PATENT OFFICE.

ARNOLD L. TRACHTE, OF MADISON, WISCONSIN.

SUBMERGED COMBINATION TANK-HEATER AND FEED-COOKER.

1,118,599.   Specification of Letters Patent.   Patented Nov. 24, 1914.

Application filed March 23, 1914. Serial No. 826,606.

*To all whom it may concern:*

Be it known that I, ARNOLD L. TRACHTE, a citizen of the United States, residing at Madison, in the county of Dane and State of Wisconsin, have invented a new and useful Submerged Combination Tank - Heater and Feed-Cooker, of which the following is a specification.

My invention relates to a partially submerged device for warming water in a tank for drinking purposes for stock and for cooking feed at the same time.

The object of my invention is to provide a submerged combination tank heater and feed cooker constructed so as to provide a downward direct or indirect draft; to provide a stationary grate and fire box; to provide a removable ash pan and further to provide a chamber shaped and arranged so as to permit of the removal of the ash pan without removing the device as a whole from its partially submerged position in a water tank; and to provide a combination feed door and draft regulator, having an opening to be used for cooking feed. I attain these objects by the mechanism illustrated in the accompanying drawings, in which—

Figure 1 is a side view of the device, partly in section; Fig. 2 is a top plan; Fig. 3 is a horizontal section, looking down, from line 3—3 of Fig. 1; Fig. 4 is a detail view of the latch.

Like characters of reference refer to like parts throughout the several views.

Referring to the accompanying drawings, I provide a water-tight casing 1 in which is positioned a grate 2, as shown in Figs. 1 and 3. I provide a diaphragm 3 that partitions the casing substantially into two chambers or compartments. I provide a fire door 4, as shown in Fig. 1. I may provide lateral flanges attached to pivoted lid 5; and I further provide a latch 7, having notches 6 to hold the lid open at various positions, over chamber B. I provide a damper 8, as shown in Fig. 1; and an ash pan 11, removable through chamber A and cleaning out door 14 for passage of ash pan 11, when the cleaning-out door lid 19 is raised. Pivoted lid 19 is provided with an aperture or opening for the cooking of feed, a lid 17 also being provided, as shown to cover the aforesaid opening when not in use for cooking purposes. I provide a smoke flue 18, centrally disposed and opening out of chamber A, as shown in Figs. 1 and 2.

In operating the device, lid 5 is raised as shown in dotted lines in Fig. 1 for the introduction of fuel to chamber B and grate 2. Damper 8 is pivotally or swingingly mounted. To hasten combustion, damper 8 is raised to its open or upright position adjacent diaphragm 3, as shown in dotted lines in Fig. 1. When in its lowered position damper 8 may be kept from touching the bottom of the heater preferably by lugs 10 on the grate, or by the projecting bars of grate 2 (projecting slightly more than shown) should such construction prove more desirable. After the fire is started the damper 8 is moved to its lowered position, shown in heavy lines in Fig. 1, thus forcing the gases to the bottom of the heater and obtaining the full benefit of the heat contained therein.

To facilitate the cleaning out of the ashes, an ash pan 11 is placed under grate 2, between legs 12 of the grate. When filled with ashes it may readily be withdrawn by means of handle 13, into chamber A and through cleaning-out door 14, lid 19 being raised as shown in dotted lines in Fig. 1, the chamber A and door 14 being of such shape and size as to permit of the removal of the ash pan without spilling its contents and without removing the tank heater as a whole from its submerged position in a tank of water.

Lid 17 may be swung back from its position over opening 16 in lid 19, to permit of the heating of pails or kettles of water and to permit of the cooking of feed with my device.

For regulating the draft, latch 7 has notches 6 which engage with the slotted portion of lid 5 to hold the lid open in any desired position.

What I claim is:

A submerged combination tank heater and feeder cooker having a water tight outer casing, a fire chamber, a heating chamber a pivoted damper disposed between the two chambers, a grate for the fire chamber having projecting means for supporting the damper in open position out of engagement with the floor of the heating chamber, an ash pan removable from the device through its uppermost portion while submerged, a pivoted lid for the heating chamber, the heating chamber, ash pan and aforesaid lid extending over approximately equal horizontal areas, and an adjustable pivoted lid mounted over the fire chamber, whereby a downward direct or indirect draft may be had, and a flue approximately centrally disposed between the aforesaid pivoted lid members, substantially as shown.

In testimony whereof I hereto affix my signature in the presence of two witnesses.

ARNOLD L. TRACHTE.

Witnesses:
CARL N. HILL,
A. A. MARTIN.

Copies of this patent may be obtained for five cents each, by addressing the "Commissioner of Patents, Washington, D. C."